(12) United States Patent
Yoshida

(10) Patent No.: US 12,498,498 B2
(45) Date of Patent: Dec. 16, 2025

(54) IMAGE PROCESSING APPARATUS, RADIATION IMAGING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Iori Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 18/414,775

(22) Filed: Jan. 17, 2024

(65) Prior Publication Data
US 2024/0248220 A1    Jul. 25, 2024

(30) Foreign Application Priority Data
Jan. 24, 2023    (JP) .................................. 2023-008951

(51) Int. Cl.
G06F 17/30    (2006.01)
A61B 6/46    (2024.01)
G01T 1/29    (2006.01)

(52) U.S. Cl.
CPC ............ *G01T 1/2992* (2013.01); *A61B 6/461* (2013.01)

(58) Field of Classification Search
CPC ....... A61B 6/00; A61B 6/4216; A61B 6/4494; A61B 6/465; A61B 6/463; A61B 6/461; A61B 6/548; A61B 6/5217; A61B 6/52; A61B 6/5205; A61B 6/5211; A61B 5/0013; G16H 30/20; G16H 30/40; G16H 40/67; H04L 67/12
See application file for complete search history.

(56) References Cited

U.S. PATENT DOCUMENTS

2004/0086164 A1* 5/2004 Moriyama ............. G16H 40/67
250/584

FOREIGN PATENT DOCUMENTS

JP    2021-058272 A    4/2021

\* cited by examiner

*Primary Examiner* — Don K Wong
(74) *Attorney, Agent, or Firm* — Carter, DeLuca & Farrell LLP

(57) ABSTRACT

An image processing apparatus for processing a radiation image, includes: a reception unit configured to receive processing information obtained by processing of the radiation image by an external processing apparatus; and a display control unit configured to control displaying at least one of a reception status of the processing information and a determination result of the reception status on a display unit.

19 Claims, 13 Drawing Sheets

| IMAGING METHOD ID | NAME | SENSOR | EXTERNAL PROCESSING | PROCESSING REQUEST DESTINATION |
|---|---|---|---|---|
| 1 | FRONT-OF-CHEST BUTTON | SENSOR A | ON | SYSTEM A |
| 2 | FRONT-OF-CHEST BUTTON | SENSOR A | OFF | — |
| 3 | FRONT-OF-ABDOMEN | SENSOR A | ON | SYSTEM B, SYSTEM C |

3B

| EXTERNAL PROCESSING ID | IMAGING METHOD ID | PROCESSING REQUEST DESTINATION | PROCESSING CONTENT | PROCESSING INFORMATION |
|---|---|---|---|---|
| 1 | 1 | SYSTEM A | PROCESSING 1 | IMAGE |
| 2 | 1 | SYSTEM A | PROCESSING 2 | IMAGE |
| 3 | 3 | SYSTEM B | PROCESSING 3 | IMAGE |
| 4 | 3 | SYSTEM B | PROCESSING 4 | OVERLAY |
| 5 | 3 | SYSTEM C | PROCESSING 5 | ANNOTATION |

F I G. 4

| IMAGE ID | IMAGING METHOD ID | SOURCE | PROCESSING CONTENT | CONFIRMATION NECESSITY | CONFIRMATION STATE | EXTERNAL PROCESSING REQUEST TIME | REQUEST COUNT | RECEPTION COUNT |
|---|---|---|---|---|---|---|---|---|
| 1 | 1 | IMAGING APPARATUS | — | — | — | 14:00:00 | 2 | 2 |
| 2 | 1 | SYSTEM A | PROCESSING 1 | NECESSARY | CONFIRMED | — | — | — |
| 3 | 1 | SYSTEM A | PROCESSING 2 | NEGATIVE | — | — | — | — |
| 4 | 2 | IMAGING APPARATUS | — | — | — | — | — | — |
| 5 | 3 | IMAGING APPARATUS | — | — | — | 14:01:50 | 3 | 2 |
| 6 | 3 | SYSTEM B | PROCESSING 3 | NECESSARY | NOT YET | — | — | — |
| 7 | 3 | SYSTEM B | PROCESSING 4 | NECESSARY | NOT YET | — | — | — |
| 8 | 3 | SYSTEM C | PROCESSING 5 | NECESSARY | NOT YET | — | — | — |

FIG. 5A

PATIENT NAME: [ ]
DATE OF BIRTH: [ / / ]
PATIENT ID: [ ]

| EXAMINATION ID | PATIENT ID | PATIENT NAME | GENDER | DATE OF BIRTH | AGE |
|---|---|---|---|---|---|
| O001 | P333 | QUINONE SABURO | MALE | 1981/11/11 | 29 |
| O002 | P222 | QUINONE JIRO | MALE | 2002/2/2 | 7 |
| O003 | P111 | QUINONE TARO | MALE | 2001/1/10 | 8 |
| O004 | P777 | QUINONE HANAKO | FEMALE | 1977/7/7 | 12 |
| O005 | P123 | QUINONE ICHIRO | MALE | 2003/3/3 | 3 |
| O006 | P444 | QUINONE SHIRO | MALE | 1964/4/4 | 45 |
| O007 | P555 | QUINONE GORO | MALE | 1955/5/5 | 54 |
| O008 | P666 | QUINONE ROKURO | MALE | 1976/6/6 | 33 |

PATIENT NAME:
PATIENT ID:
DATE OF BIRTH:
AGE:
GENDER:

EXAMINATION ID:

AGE: [ ]
GENDER: ○ MALE ○ FEMALE ○ OTHER
[CONFIRMATION]

[INPUT IMAGING INFORMATION]
[START EXAMINATION]

FIG. 5B

101 — 
PATIENT NAME: [     ]
DATE OF BIRTH: [  /  /  ]     AGE: [    ]
PATIENT ID: [     ]
GENDER: ○ MALE  ○ FEMALE  ○ OTHER

102 — [CONFIRMATION]

104 —
PATIENT NAME: QUINONE TARO
PATIENT ID: P111
DATE OF BIRTH: 2001/1/10
AGE: 8
GENDER: MALE

EXAMINATION ID: O003

109a — [FRONT-OF-CHEST BUTTON    SENSOR A]
109b — [SIDE-OF-CHEST    SENSOR A]
105

106 — [INPUT IMAGING INFORMATION]
107 — [START EXAMINATION]

103 —

| EXAMINATION ID | PATIENT ID | PATIENT NAME | GENDER | DATE OF BIRTH | AGE |
|---|---|---|---|---|---|
| O001 | P333 | QUINONE SABURO | MALE | 2003/3/3 | 6 |
| O002 | P222 | QUINONE JIRO | MALE | 2002/2/2 | 7 |
| O003 | P111 | QUINONE TARO | MALE | 2001/1/10 | 8 |
| O004 | P777 | QUINONE HANAKO | FEMALE | 1977/7/7 | 12 |
| O005 | P123 | QUINONE ICHIRO | MALE | 1981/11/11 | 27 |
| O006 | P444 | QUINONE SHIRO | MALE | 1964/4/4 | 45 |
| O007 | P555 | QUINONE GORO | MALE | 1955/5/5 | 54 |
| O008 | P666 | QUINONE ROKURO | MALE | 1976/6/6 | 33 |

| IMAGING METHOD LIST | | | ← → |
|---|---|---|---|
| FRONT OF CRANIUM SENSOR A | SIDE OF CRANIUM SENSOR A | SIDE OF NASAL BONE SENSOR A | |
| FRONT OF CERVICAL VERTEBRAE SENSOR A | SIDE OF CERVICAL VERTEBRAE SENSOR A | FRONT-OF-CHEST BUTTON SENSOR A | |
| SIDE-OF-CHEST SENSOR A | FRONT-OF-CHEST BUTTON SENSOR B | SIDE-OF-CHEST SENSOR B | |
| FRONT-OF-CHEST BUTTON SENSOR C | SIDE-OF-CHEST SENSOR C | FRONT OF THORACIC VERTEBRAE SENSOR B | |
| SIDE OF THORACIC VERTEBRAE SENSOR B | FRONT OF YOUNG CHILD'S CHEST SENSOR C | SIDE OF YOUNG CHILD'S CHEST SENSOR C | |
| FRONT OF NEWBORN'S CHEST SENSOR D | SIDE OF NEWBORN'S CHEST SENSOR D | FRONT-OF-ABDOMEN SENSOR A | |
| SIDE OF ABDOMEN SENSOR A | FRONT-OF-ABDOMEN SENSOR C | SIDE OF ABDOMEN SENSOR C | |
| FRONT OF PELVIS SENSOR A | SIDE OF PELVIS SENSOR A | FRONT OF PELVIS SENSOR B | |

115

PATIENT NAME: QUINONE TARO
PATIENT ID: P111
DATE OF BIRTH: 2001/1/10
AGE: 8
GENDER: MALE — 104

EXAMINATION ID: O003

| FRONT-OF-CHEST BUTTON SENSOR A | — 109a |
| SIDE-OF-CHEST SENSOR A | — 109b |

105

INPUT IMAGING INFORMATION — 106

START EXAMINATION — 107

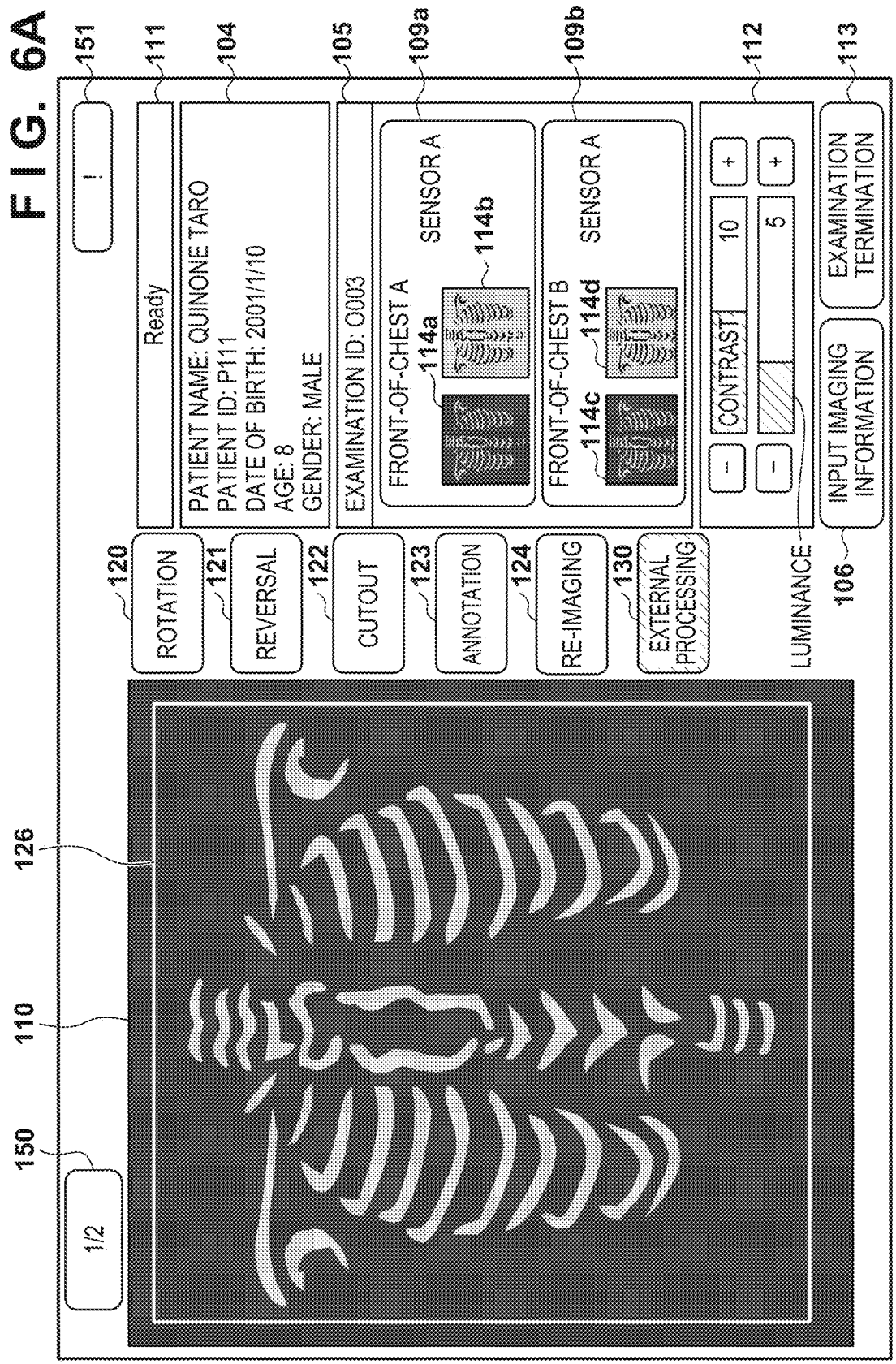

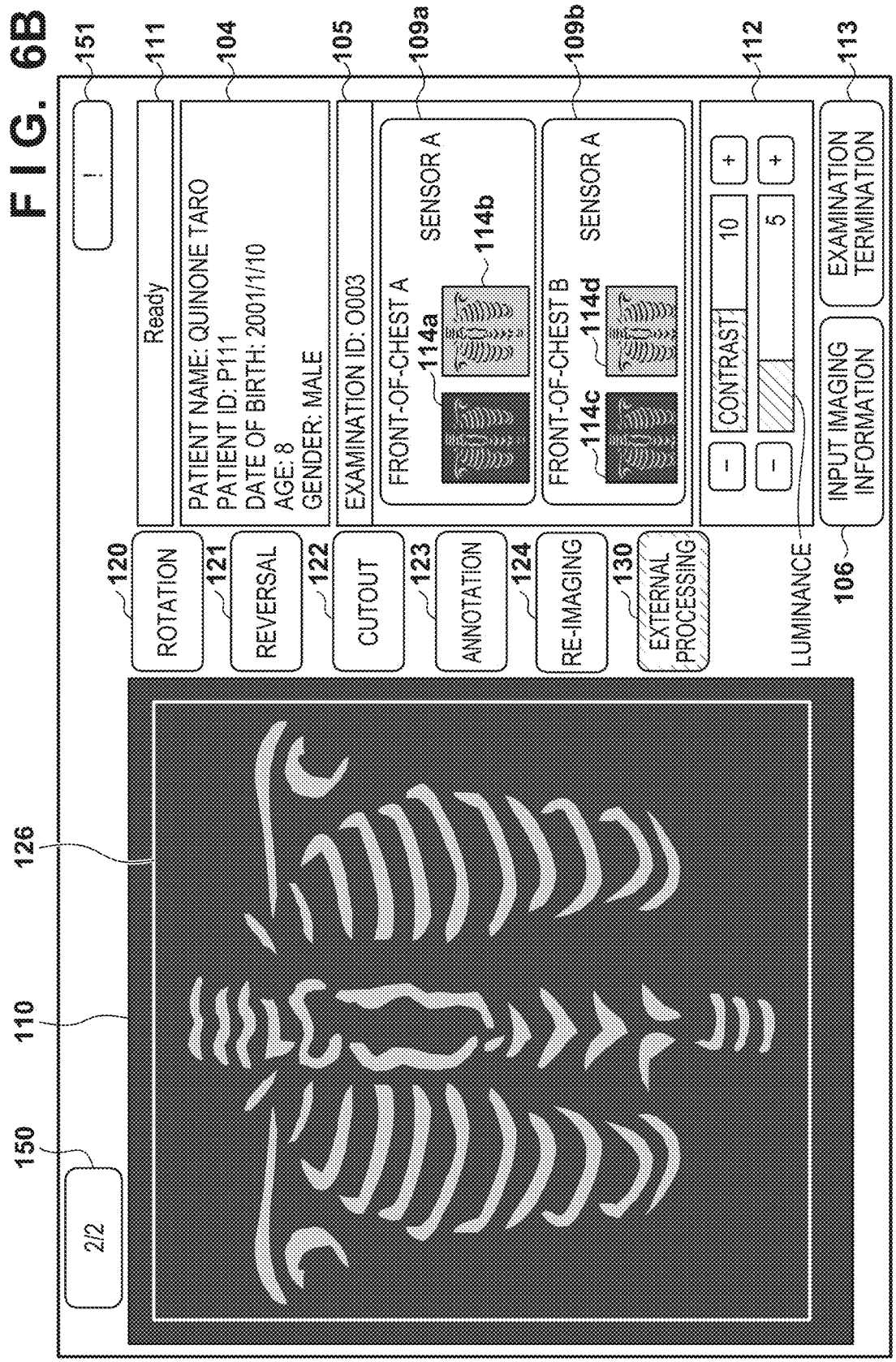

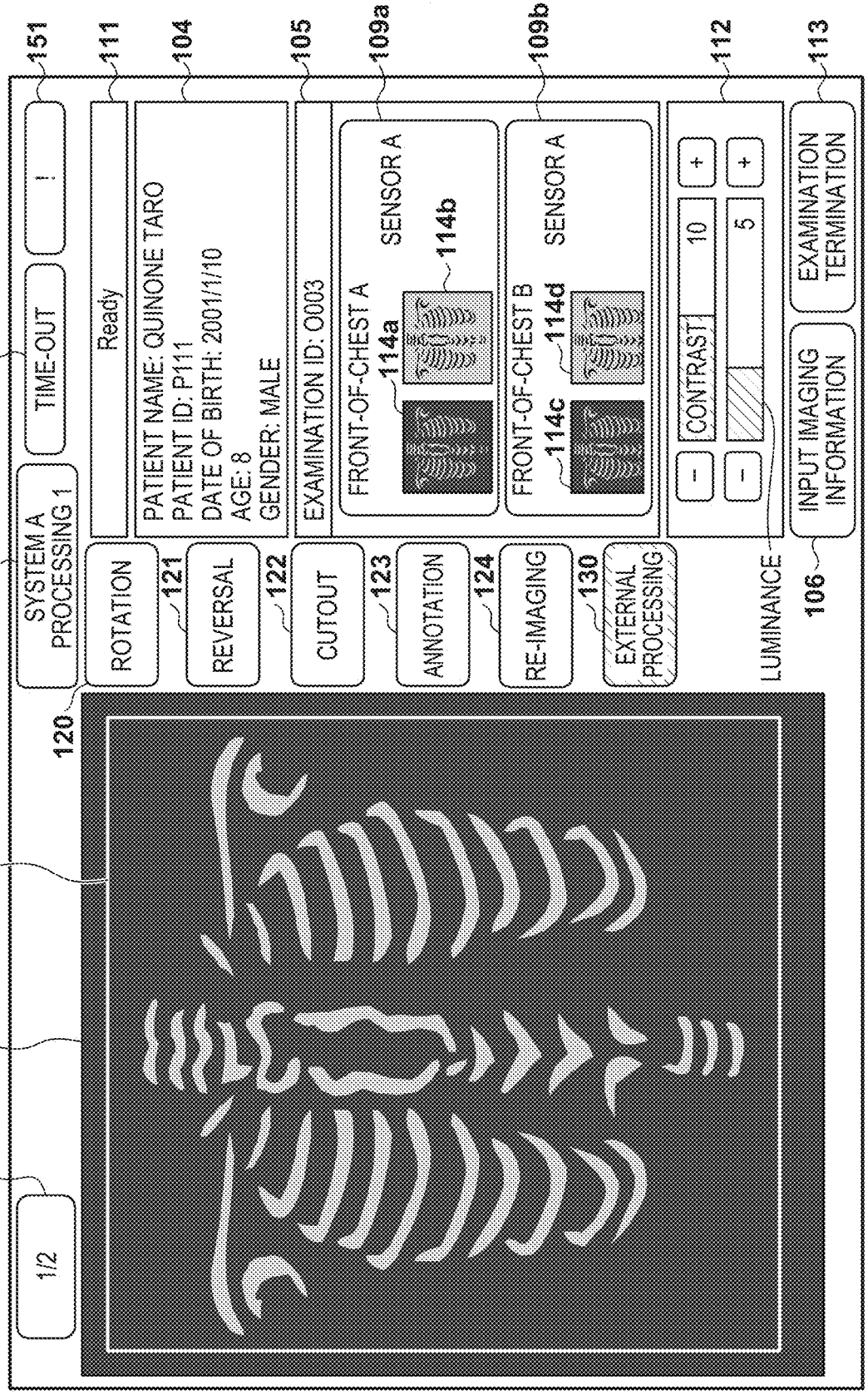

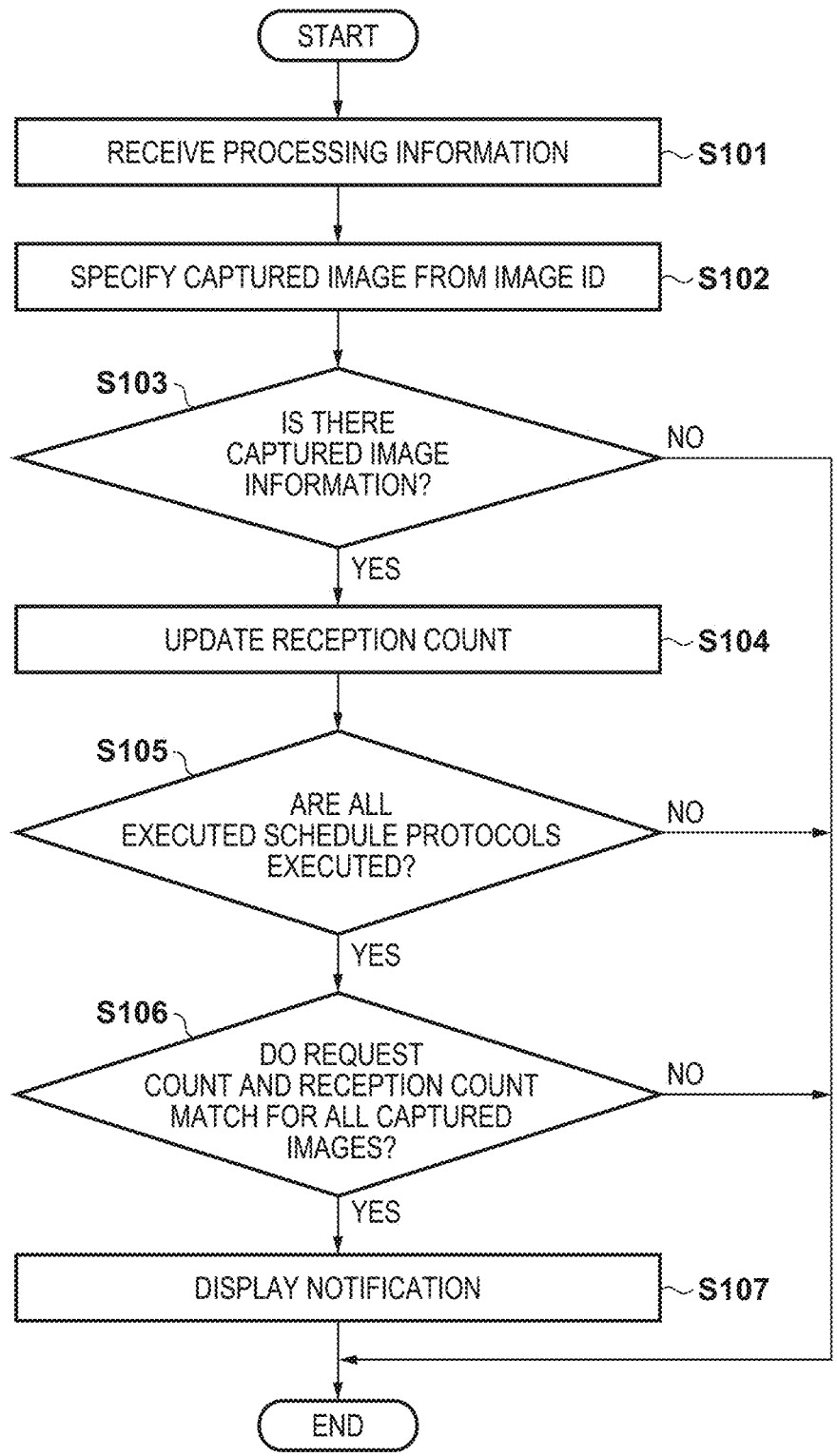

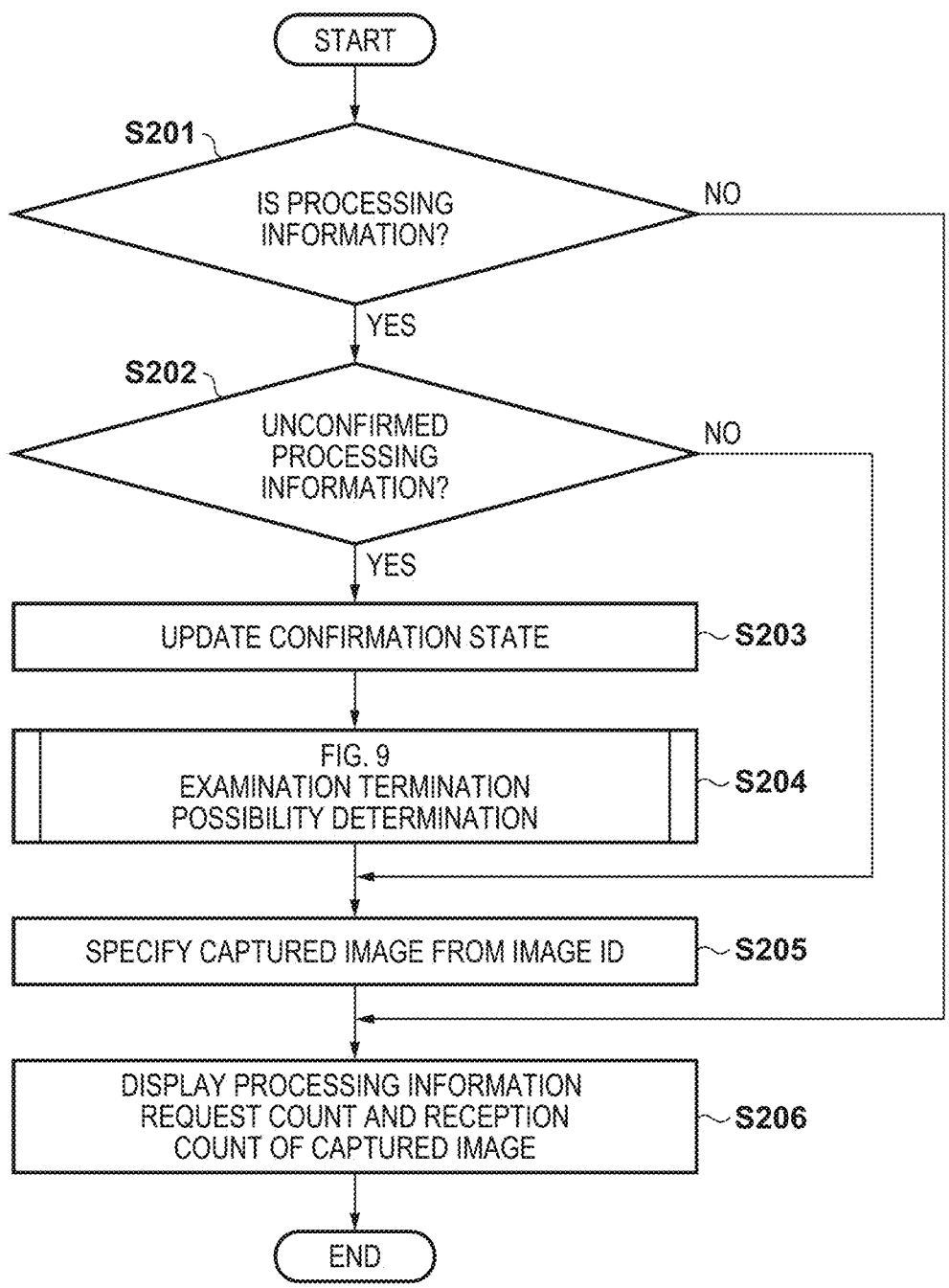

IMAGE PROCESSING APPARATUS, RADIATION IMAGING SYSTEM, IMAGE PROCESSING METHOD, AND NON-TRANSITORY COMPUTER-READABLE STORAGE MEDIUM

BACKGROUND OF THE INVENTION

Field of the Invention

The disclosed technique relates to an image processing apparatus, a radiation imaging system, an image processing method, and a non-transitory computer-readable storage medium.

Description of the Related Art

In recent years, the Artificial Intelligence (AI) technology has advanced to support medical image diagnosis. Diagnosis support image processing is mounted on a radiation imaging system. However, by using image processing outside the radiation imaging system, it is possible to obtain support more useful for doctors. The radiation imaging system can cooperate with an external image processing system (to be also referred to as an external processing apparatus hereinafter) by transmitting/receiving an image (radiation image) as a processing source and an image (to be also referred to as a processed image hereinafter) obtained by performing image processing or the like for the image (radiation image), thereby providing, for diagnosis, the image having undergone processing not mounted on the radiation imaging system. For example, Japanese Patent Laid-Open No. 2021-58272 discloses an arrangement in which a medical image is transmitted to a processing server and undergoes Computer-Aided Diagnosis (CAD) processing.

There can be many external processing apparatuses with which the radiation imaging system cooperates in accordance with processing contents. In a case where a plurality of processed images are received from external processing apparatuses during an examination, it may be difficult for an operator to grasp the reception statuses of the processed images. If the examination is terminated in a state in which there is an unreceived or unconfirmed processed image, the processed image cannot be reflected on an examination result, and it may thus be impossible to achieve a predetermined examination purpose.

The disclosed technique proposes a technique of making it possible to display the reception status of processing information.

SUMMARY OF THE INVENTION

According to one aspect of the present invention, there is provided an image processing apparatus for processing a radiation image, comprising: a reception unit configured to receive processing information obtained by processing of the radiation image by an external processing apparatus; and a display control unit configured to control displaying at least one of a reception status of the processing information and a determination result of the reception status on a display unit.

According to another aspect of the present invention, there is provided an image processing method of processing a radiation image, comprising: receiving processing information obtained by processing of the radiation image by an external processing apparatus; controlling to display at least one a reception status of the processing information and a determination result of the reception status on a display unit.

Further features of the present invention will become apparent from the following description of exemplary embodiments (with reference to the attached drawings).

BRIEF DESCRIPTION OF THE DRAWINGS

FIG. 2 is a block diagram showing the functional arrangement of a control unit;

FIG. 3 shows examples of an imaging method table and an external processing table stored in a storage unit shown in FIG. 2;

FIG. 4 is a table showing an example of an image table that stores a captured image, a processed image generated by an external processing apparatus, and processing information;

FIG. 5A is a view exemplifying an examination input screen in a radiation imaging apparatus according to the embodiment;

FIG. 5B is a view exemplifying the examination input screen in the radiation imaging apparatus according to the embodiment;

FIG. 5C is a view exemplifying the examination input screen in the radiation imaging apparatus according to the embodiment;

FIG. 6A is a view exemplifying an imaging screen in the radiation imaging apparatus according to the embodiment;

FIG. 6B is a view showing a modification of the imaging screen in the radiation imaging apparatus according to the embodiment;

FIG. 6C is a view exemplifying the imaging screen in the radiation imaging apparatus according to the embodiment;

FIG. 7 is a flowchart illustrating an example of reception processing procedure of obtaining processing information;

FIG. 8 is a flowchart illustrating an example of a display processing procedure of displaying the reception status of the processing information;

DESCRIPTION OF THE EMBODIMENTS

Figure 1:
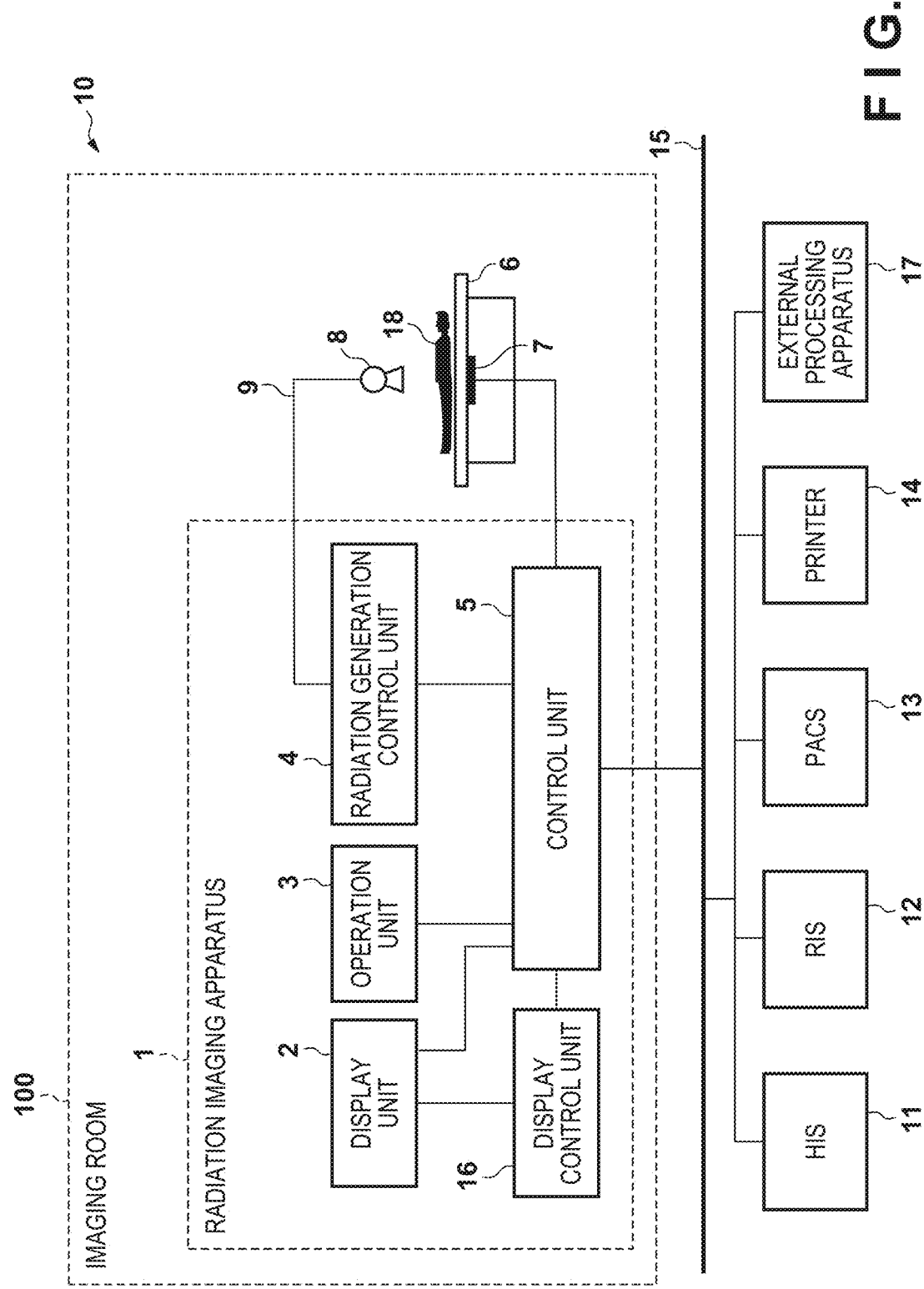
FIG. 1 is a view showing an example of the arrangement of a radiation imaging system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Radiation according to the disclosed technique includes not only α-rays, β-rays, and γ-rays that are beams generated by particles (including photons) emitted by radioactive decay but also beams having equal or more energy, for example, X-rays, particle rays, and cosmic rays.

The arrangement and operation of a radiation imaging system 10 according to an embodiment will be described with reference to FIGS. 1 to 6A.

Arrangement of Radiation Imaging System

FIG. 1 is a view showing an example of the arrangement of the radiation imaging system 10 according to the embodiment. The radiation imaging system 10 includes a radiation imaging apparatus 1 and a radiation detector 7. In the radiation imaging system 10, the radiation imaging apparatus 1 is communicably connected to an HIS 11, an RIS 12, a PACS 13, a printer 14, and an external processing apparatus 17 via a network 15. The Hospital Information System (HIS) 11 is a hospital information system that manages the progress of radiation imaging (examination).

The Radiology Information System (RIS) 12 is a radiology information system that transmits an examination order to the radiation imaging apparatus 1. The Picture Archiving and Communication Systems (PACS) 13 is an image server and manages a radiation image. The printer 14 prints out the radiation image. The external processing apparatus 17 performs processing for the radiation image.

The HIS 11 may include a server that manages accounting information. If radiation imaging is performed, an operator inputs an examination instruction from a terminal (input unit) of the HIS 11, and transmits it to a radiology department. This request information is called an examination order, and this examination order includes the department name of a request source, an examination ID, an examination item, and patient information (subject information) concerning an object 18 (subject). Upon receiving the examination order transmitted from the RIS 12, the radiology department adds, as an imaging protocol, imaging information (imaging portion information, imaging direction information, and procedure information, and the like) concerning the radiation imaging to the examination order, and transmits the examination order to the radiation imaging apparatus 1.

The radiation imaging apparatus 1 executes radiation imaging in accordance with the received examination order. The radiation imaging apparatus 1 obtains a captured radiation image, generates examination information by associating the radiation image with the examination order, and transmits the examination information to the PACS 13 together with the radiation image.

The PACS 13 is a server mainly for image management. A radiation image examination operation, detailed post-processing, and a diagnostic operation are performed using a high-resolution monitor connected to the PACS 13.

Execution information (image ID, imaging date and time, and the like) of the examination by the radiation imaging apparatus 1 is also transmitted to the HIS 11. The execution information transmitted to the HIS 11 is also used for accounting processing after the examination in addition to the progress management of the examination.

The external processing apparatus 17 is an apparatus that performs image processing and the like for the radiation image. The external processing apparatus 17 performs diagnosis support processing using the Artificial Intelligence (AI) technology, and transmits generated processing information (processed image) to an apparatus such as the radiation imaging apparatus 1 or the PACS 13. The processing information generated by the external processing apparatus 17 is not limited to the image (processed image), and may be an information object such as a heat map or a measurement object, examination information, a diagnosis information (diagnosis support information) as a result of CAD processing, or the like. The radiation imaging apparatus 1 presents the processing information obtained from the external processing apparatus 17 together with the captured image (radiation image), and provides processing not mounted on the radiation imaging apparatus 1.

The radiation imaging apparatus 1, the HIS 11, the RIS 12, the PACS 13, the printer 14, and the external processing apparatus 17 are connected via the network 15 formed by, for example, a Local Area Network (LAN) or a Wide Area Network (WAN). Note that the external processing apparatus 17 need not be an apparatus physically different from the radiation imaging apparatus 1, and may be arranged on another computer which is virtualized in the same apparatus as the radiation imaging apparatus 1 and is different from the radiation imaging apparatus 1. Alternatively, a virtualized computer in which the external processing apparatus 17 is arranged may exist on a cloud. Note that each of these apparatuses includes one or a plurality of computers. Each computer is provided with, for example, a control unit such as a CPU and a storage unit such as a Read Only Memory (ROM) or a Random Access Memory (RAM). Furthermore, the computer may be provided with a communication unit such as a network card, an input/output unit such as a keyboard, a display, or a touch panel, and the like. The respective components are electrically connected by a bus or the like, and are controlled when a main control unit reads out a program stored in the storage unit and executes the readout program.

In the radiation imaging system 10, the radiation detector 7 functions as a detector that detects radiation transmitted through the object 18, and obtains image data (radiation image) based on the radiation transmitted through the object 18. More specifically, the radiation detector 7 detects the radiation transmitted through the object 18 as electric charges corresponding to the transmitted radiation close. For example, a direct conversion type sensor that directly converts radiation into electric charges, such as an a-Se sensor that converts radiation into electric charges, or an indirect type sensor using a scintillator such as a CsI scintillator and a photoelectric conversion element such as an a-Si photoelectric conversion element can be used as the radiation detector 7.

The radiation detector 7 A/D-converts the detected electric charges to generate image data, and accumulates it in a storage unit (not shown). The radiation detector 7 adds image information (image ID, imaging date and time, and image data transfer status) to the image data (radiation image), and transfer the image information to the radiation imaging apparatus 1 together with the image data. The radiation detector 7 can be installed on, for example, an imaging table 6.

Arrangement of Radiation Imaging Apparatus 1

The radiation imaging apparatus 1 includes a display unit 2 that displays a radiation image and various kinds of information, an operation unit 3 used by an operator to perform an operation, a radiation generation control unit 4, a display control unit 16, and a control unit 5 that controls the respective components. The control unit 5 functions as an image processing apparatus that processes the radiation image.

The display unit 2 is implemented by, for example, a liquid crystal display or the like, and displays various kinds of information to an operator (for example, a radiographer, a doctor, or the like). The operation unit 3 is formed from, for example, a mouse, an operation button, and the like, and inputs various kinds of instructions from the operator to the respective components. Note that the display unit 2 and the operation unit 3 may be implemented as a touch panel integrating them.

The radiation generation control unit 4 is connected to a radiation generation unit 8 via a cable 9, and controls radiation irradiation from the radiation generation unit 8 by setting a radiation imaging condition in the radiation generation unit 8.

The radiation generation unit 8 functions as a radiation source that generates radiation. The radiation generation unit 8 is implemented by, for example, a radiation tube, and emits radiation toward the object 18 (for example, a specific portion of the object). A diaphragm (not shown) for shielding radiation is provided in the irradiation surface of the radiation generation unit 8. The radiation generation unit 8 irradiates a desired irradiation range with radiation. The radiation generation control unit 4 can adjust the irradiation range of the radiation emitted from the radiation generation unit 8 by controlling the diaphragm that shields the radiation.

The control unit 5 is connected to the radiation detector 7 via a wireless LAN. Image information (image ID, imaging date and time, and image data transfer status), image data, control signals, and the like are transmitted and received between the control unit 5 and the radiation detector 7. The control unit 5 generates a control signal in accordance with the set imaging condition, and controls the radiation detector 7 based on the control signal. The image data (radiation image) and image information stored in the radiation detector 7 by radiation imaging are output (transferred) to the control unit 5 via the wireless LAN. Note that the control unit 5 and the radiation detector 7 may be connected via a cable.

Functional Arrangement of Control Unit 5

The control unit 5 of the radiation imaging apparatus 1 generates an image by performing image processing for image data (radiation image) obtained from the radiation detector 7. The control unit 5 includes, for example, a Central Processing Unit (CPU) and a dedicated or general-purpose processor. The processor implements various kinds of functions (to be described later) by executing various kinds of programs stored in a storage unit 23 in the control unit 5. The control unit 5 may be formed by hardware such as a Field Programmable Gate Array (FPGA) or Application Specific Integrated Circuit (ASIC). The control unit 5 may be formed by a single processor, or a combination of a plurality of individual processors. Various kinds of functions (to be described later) can also be implemented by these hardware components. Furthermore, the control unit 5 can implement various kinds of functions by a combination of hardware processing and software processing by the processor and programs.

The control unit 5 controls the radiation detector 7 while outputting, to the display unit 2, the radiation image obtained from the radiation detector 7 and outputting a graphical user interface (GUI) to the display unit 2. The control unit 5 performs, in cooperation with the display control unit 16, display control of displaying, in a first region (for example, a region in a front-of-chest button 109*a* or a region in a side-of-chest button 109*b*) of the display unit 2, a thumbnail image of the radiation image (captured image) obtained from the radiation detector 7 and a thumbnail image of a processed image obtained by performing image processing or the like for the radiation image in the external processing apparatus 17. Furthermore, the control unit 5 functions as an acceptance unit that accepts an image editing instruction for the radiation image (captured image) displayed on the display unit 2. The control unit 5 performs image editing processing such as cutout and annotation for the radiation image (captured image) based on an image editing instruction from the operator.

Figure 2:
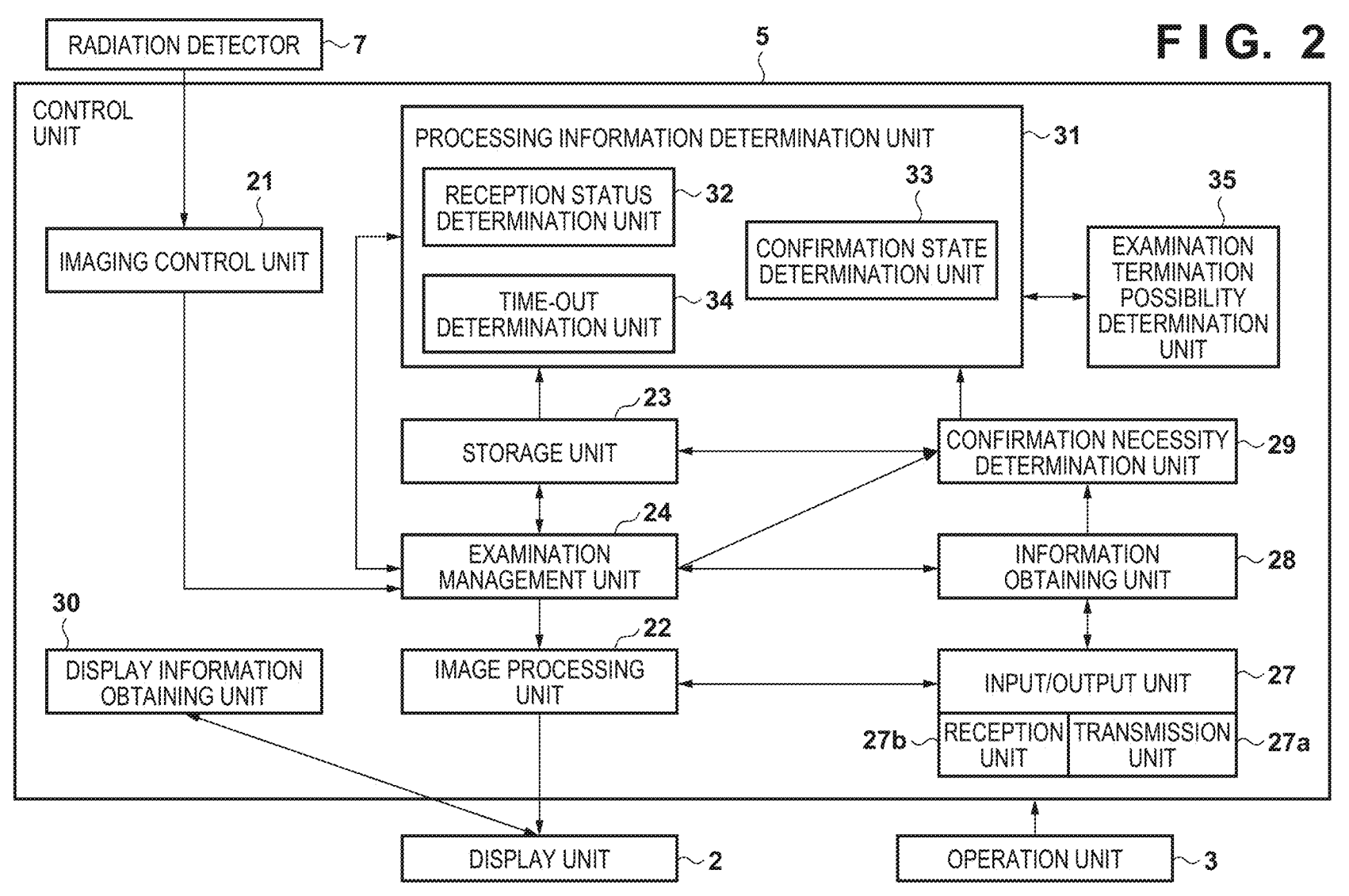

FIG. 2 is a block diagram showing the functional arrangement of the control unit 5. The control unit 5 includes an imaging control unit 21 that performs imaging control of the radiation detector 7, an image processing unit 22 that performs image processing of a radiation image obtained by imaging, and the storage unit 23 that stores the radiation image output from the radiation detector 7 and various kinds of information such as an examination order, an imaging protocol, and an imaging method.

The control unit 5 includes an examination management unit 24 that manages examination information obtained by associating the radiation image with the examination order, an input/output unit 27 that externally outputs or inputs a generated image object and processing information, an information obtaining unit 28 that obtains additional information and identification information added to the processing information input from the input/output unit 27, a confirmation necessity determination unit 29 that determines, based on the information obtained from the information obtaining unit 28 and the storage unit 23, whether it is necessary for the operator to confirm the processing information, and a display information obtaining unit 30 that obtains information indicating whether the processing information is displayed on the system (for example, the display unit 2). The examination management unit 24 obtains the identification information of the processing information, and the confirmation necessity determination unit 29 obtains the identification information of the processing information from the examination management unit 24. Note that the confirmation necessity determination unit 29 may obtain the identification information of the processing information from the information obtaining unit 28 or obtain the identification information of the processing information via the examination management unit 24.

The control unit 5 includes a processing information determination unit 31 that performs, in a case where the processing information is received from the external processing apparatus 17, determination based on the received processing information. The processing information determination unit 31 includes a reception status determination unit 32 that determines the reception status of the processing information from the external processing apparatus 17, a confirmation state determination unit 33 that determines the confirmation state of the processing information based on confirmation necessity determined by the confirmation necessity determination unit 29, and a time-out determination unit 34 that determines whether a standby time until the processing information is received exceeds a time-out. The control unit 5 also includes an examination termination possibility determination unit 35 that determines, based on the determination result of the processing information determination unit 31, whether an examination in progress can be terminated.

The storage unit 23 stores the examination information managed by the examination management unit 24, the imaging protocol, the imaging method, the radiation image output from the radiation detector 7, and various kinds of information necessary for examination management. Furthermore, the storage unit 23 stores the imaging protocol associated with the examination order, and identification information for identifying the imaging protocol.

FIG. 3 shows examples of an imaging method table and an external processing table stored in the storage unit 23 shown in FIG. 2. An imaging method table 3A shown in FIG. 3 is a table that stores, for each imaging method, setting values such as an imaging method ID added to identify (specify) the imaging method, a name, a sensor used for imaging, enable (ON) or disable (OFF) of external processing, and the request destination of the external processing. For example, in the case of front-of-chest imaging of imaging method ID 1, the setting of the external processing is "enable", and the request destination of the external processing for an image obtained by sensor A is linked with system A. Similarly, in the case of front-of-abdomen imaging of imaging method ID 3, the setting of the external processing is "enable", and the request destination of the external processing for an image obtained by sensor A is linked with system B and system C.

An external processing table 3B is a table that associates an external processing ID added to identify external processing, the imaging method ID, the processing request destination, processing contents, and processing information generated in accordance with the set processing contents. For example, in imaging method ID 1 specified by external processing IDs 1 and 2, in system A, an image 131 having undergone processing 1 and an image 132 having undergone processing 2 are generated. In imaging method ID 3 specified by external processing IDs 3 to 5, generation of an image 133 by processing 3 and overlay processing 134 by processing 4 are performed in system B, and processing information having undergone annotation processing 135 by processing 5 is generated in system C. The processing information may include diagnosis information (diagnosis support information) obtained by image processing for imaging information (radiation image). That is, the processing information includes at least one of information (image) obtained by performing image processing for imaging information (radiation image), information (image) obtained by performing overlay processing for the radiation image, information (image) obtained by performing annotation processing for the radiation image, and diagnosis information obtained by performing image processing for the imaging information (radiation image).

FIG. 4 is a table showing an example of an image table that stores the captured image, the processed image generated by the external processing apparatus 17, and the processing information, which are stored in the storage unit 23 shown in FIG. 2. The image table shown in FIG. 4 stores an image ID added to each image, the imaging method ID, an image generation source (source), and processing contents (for example, processing 1, 2, . . . ) performed by the external processing apparatus 17 (for example, system A, B, or C). Furthermore, the image table stores information (confirmation necessity) indicating whether the processing information needs to be confirmed by the operator, the confirmation state of the processing information by the operator, an external processing request time, a processing request count to the external processing apparatus 17, and a processing information reception count from the external processing apparatus 17.

The external processing request time is the start time of performing time-out processing, and the time when an external processing button 130 is pressed is set. When performing the time-out processing, time measurement starts from the external processing request time.

An image of image ID 1 is a captured image (radiation image) obtained by the radiation imaging apparatus 1, and an image of image ID 2 and an image of image ID 3 are generated using the captured image (radiation image) as a source image. The image of image ID 2 is a processed image having undergone processing 1 by the external processing apparatus 17 (system A), and the image of image ID 3 is a processed image having undergone processing 2 by the external processing apparatus 17 (system A).

An image of image ID 4 is a captured image (radiation image) obtained by the radiation imaging apparatus 1. An image of image ID 5 is a captured image (radiation image) obtained by the radiation imaging apparatus 1, and an image of image ID 6, an image of image ID 7, and an image of image ID 8 are generated using the captured image (radiation image) of image ID 5 as a source image. The image of image ID 6 is a processed image having undergone processing 3 by the external processing apparatus 17 (system B), the image of image ID 7 is a processed image having undergone processing 4 by the external processing apparatus 17 (system B), and the image of image ID 8 is a processed image having undergone processing 5 by the external processing apparatus 17 (system C).

If the processing information is an image, when, for example, the image is displayed in an image display region 110 of the display unit 2 shown in FIG. 6A, the confirmation state of the processing information is determined as a state in which confirmation by the operator is complete. If the processing information is an object other than an image, when the object is superimposed on a captured image or a processed image of the same imaging ID and displayed in the image display region 110, it is determined that confirmation is complete. Note that the object other than the image may singly be displayed in a display region of the display unit 2 other than the image display region 110.

As shown in the external processing table 3B, processing contents are different depending on the processing request destination, and processing information that needs to be confirmed by the operator during an examination and processing information that need not be confirmed are determined in advance in accordance with the processing contents, as indicated by the confirmation necessity setting information in the image table shown in FIG. 4.

For example, in the image table shown in FIG. 4, with respect to imaging method ID 1 (image ID 2 and external processing ID 1 of the external processing table 3B), "necessary" is set as the confirmation necessity information, and the operator needs to confirm the processing information of processing 1 displayed on the display unit 2 during an examination. If it is determined, based on a signal (display instruction signal) obtained by the display information obtaining unit 30 (to be described later), that the processing information of processing 1 is displayed on the display unit 2, when the processing information of processing 1 is displayed on the display unit 2, it is determined that confirmation by the operator is complete. That is, it is determined that the operator confirms the processing information displayed on the display unit 2. If it is determined that the operator confirms the processing information, "confirmed" is set as the confirmation state of the operator in the image table shown in FIG. 4.

With respect to imaging method ID 1 (image ID 3 and external processing ID 2 of the external processing table 3B), "unnecessary" is set as the confirmation necessity information, and the operator need not confirm the processing information of processing 2 during an examination.

With respect to imaging method ID 3 (image IDs 6 to 8 and external processing IDs 3 to 5 of the external processing table 3B), "necessary" is set as the confirmation necessity information, and the operator needs to confirm the pieces of processing information of processing 3, processing 4, and processing 5 displayed on the display unit 2 during an examination. If it is determined, based on a signal (display instruction signal) obtained by the display information obtaining unit 30, that the pieces of processing information of processing 3, processing 4, and processing 5 are not displayed on the display unit 2, it is determined that the operator does not confirm the pieces of processing information. If it is determined that the operator does not confirm the pieces of processing information, "unconfirmed" is set as the confirmation state of the operator in the image table shown in FIG. 4. In the setting example of the image table shown in FIG. 4, an unconfirmed state is indicated for image IDs 6 to 8.

As shown in the image table shown in FIG. 4, the necessity of confirmation of the processing information by the operator during an examination is preset in accordance with the processing contents. The information obtaining unit 28 obtains the identification information (for example, the external processing ID or the like) of the processing information input from the input/output unit 27, and the confirmation necessity determination unit 29 determines, based on the information obtained from the information obtaining unit 28 and the information obtained from the storage unit 23 (for example, the external processing table 3B and the image table shown in FIG. 4), whether the operator needs to confirm the processing information.

The examination management unit 24 manages an imaging protocol associated with an examination order, that defines an imaging method, an imaging condition, an image processing condition, and the like. For example, when generating examination information in the radiation imaging apparatus 1, the examination management unit 24 can create new examination information by associating the imaging protocol and object information input by the operation unit 3. On the other hand, if an examination is requested from the RIS 12, the examination management unit 24 obtains the imaging protocol stored in the storage unit 23 using the identification information of the imaging protocol associated with the received examination order. At this time, the examination management unit 24 may obtain the imaging protocol using, as the identification information of the imaging protocol, the imaging method ID that can be included in the imaging protocol. The examination management unit 24 creates new examination information by associating the obtained imaging protocol with the examination order. The examination management unit 24 stores the newly created examination information in the storage unit 23. Furthermore, the examination management unit 24 associates the captured image and the processing information using additional information added to the processing information (for example, the processed image) and the identification information of the captured image (radiation image). The examination management unit 24 stores the created information in the storage unit 23. At this time, the additional information includes identification information (image ID) for identifying the captured image (radiation image) and information indicating processing contents performed by the external processing apparatus 17. The identification information of the captured image (radiation image) is information (image ID) for identifying (specifying) the radiation image.

The imaging control unit 21 transmits, to the radiation detector 7, a transfer request signal to request the radiation detector 7 to transfer the accumulated radiation image, and receives (obtains) the radiation image from the radiation detector 7. The imaging control unit 21 manages the received (obtained) radiation image in association with radiation detector information concerning the radiation detector 7. Furthermore, the imaging control unit 21 associates the radiation image obtained from the radiation detector 7 with the imaging protocol and the examination information managed by the examination management unit 24.

The image processing unit 22 performs image processing for the radiation image using the imaging protocol and the examination information associated by the imaging control unit 21. The radiation image having undergone the image processing by the image processing unit 22 is displayed on the display unit 2. Alternatively, the radiation image having undergone image processing by the image processing unit 22 is externally output by a transmission unit 27a of the input/output unit 27. The image processing unit 22 performs, for example, image processing of adjusting the image itself such as luminance/contrast. The image processing unit 22 can also perform processing such as cutout or annotation for the adjusted radiation image.

Based on the signal (display instruction signal) output from the image processing unit 22 to the display unit 2, the display information obtaining unit 30 obtains information indicating whether the processing information (for example, the processed image) is displayed on the display unit 2. The information obtained by the display information obtaining unit 30 is information indicating a confirmation state of whether the operator confirms the processing information displayed on the display unit 2. For example, if it is determined based on the signal (display instruction signal) that the processing information (for example, the processed image) is displayed on the display unit 2, it is determined that the operator confirms the processing information displayed on the display unit 2.

The input/output unit 27 includes the transmission unit 27a that controls transmission processing and a reception unit 27b that controls reception processing. The reception unit 27b of the input/output unit 27 accepts input of the examination order from the RIS 12 or the processed image from the external processing apparatus 17. That is, the reception unit 27b receives the processing information obtained by the processing of the radiation image by the external processing apparatus 17. Furthermore, the transmission unit 27a of the input/output unit 27 outputs the radiation image to the external apparatus such as the PACS 13, the printer 14, or the external processing apparatus 17, and also outputs the examination execution information (image ID, imaging date and time, and the like) to the HIS 11.

The radiation imaging system 10 and the example of the functional arrangement of the radiation imaging apparatus 1 according to the embodiment have been explained above. Note that the arrangement shown in FIGS. 1 and 2 is merely an example, and can be changed appropriately. For example, although the radiation imaging apparatus 1 is connected to the various kinds of apparatuses via the network 15 in FIG. 1, the radiation imaging apparatus 1 need not always be connected to the various kinds of apparatuses via the network 15. For example, a diagnosis image may be output to a portable storage medium such as a DVD, and input to the various kinds of apparatuses via the portable storage medium. The network 15 may be formed by a wire or may partially be formed by a wireless signal transmission line.

Imaging Processing

Next, a processing procedure when capturing a radiation image along the sequence of an examination by the radiation imaging system 10 shown in FIG. 1 will be described next. First, object information (patient information) and examination information are input to the radiation imaging apparatus 1 upon receiving an examination request document or an examination request from the RIS 12. The object information includes an object name (patient name) and identification information (object ID or patient ID) of the object as information for specifying the object. The examination information includes identification information (examination ID) of an examination and imaging information defining the contents of imaging to be executed for the object.

FIGS. 5A to 5C are views each exemplifying an examination input screen in the radiation imaging apparatus 1 according to the embodiment, and FIG. 6A is a view exemplifying an imaging screen on the display unit 2 of the radiation imaging apparatus 1 according to the embodiment.

The radiation imaging apparatus 1 displays, on the display unit 2, a new examination input screen shown in FIG. 5A under the display control of the display control unit 16. As shown in FIG. 5A, the arrangement of the new examination input screen includes an object information input region 101, an object information confirmation button 102, and a requested examination list 103. In addition, the arrangement of the new examination input screen includes an object information display region 104, an imaging information display region 105, an imaging information input button 106, and an examination start button 107.

The display control unit 16 performs display control to align pieces of examination information (object information and examination information) received from the RIS 12 and display them as a list on the requested examination list 103. When one of the examinations is selected from the displayed requested examination list 103, object information (object ID (patient ID), object name (patient name), date of birth, and the like) corresponding to the selected examination is displayed in the object information display region 104, as shown in FIG. 5B. In addition, an examination ID corresponding to the selected examination is displayed in the imaging information display region 105, and imaging information corresponding to the examination ID is displayed in a region below the examination ID. The display control unit 16 can display the imaging information based on the information received from the RIS 12, as described above.

In the example shown in FIG. 5B, the display control unit 16 performs display control to display imaging method buttons 109 (for example, the front-of-chest button 109a and the side-of-chest button 109b) corresponding to the imaging information in the imaging information display region 105. Upon the pressing of the imaging information input button 106, the display control unit 16 performs display control to display an imaging condition input region 108 on the display unit 2, as shown in FIG. 5C. The display control unit 16 controls the display of the display control unit 16 to a grayed-out state to indicate that the imaging information input button 106 has been pressed. When one of a plurality of imaging method (imaging condition) selection buttons 115 displayed in the imaging condition input region 108 is selected, the display control unit 16 can further add an imaging method. The display control unit 16 performs display control to align and display the added imaging method with the front-of-chest button 109a and the side-of-chest button 109b in the imaging information display region 105. Each imaging method (each imaging condition) is associated with the imaging method ID (imaging condition ID).

The operator presses the examination start button 107 after confirming the object information (object information display region 104) and the imaging information (imaging information display region 105). This confirms the examination to be performed. Upon the pressing of the examination start button 107, the display control unit 16 of the radiation imaging apparatus 1 displays the imaging screen shown in FIG. 6A on the display unit 2. The imaging screen shown in FIG. 6A is a screen used at the time of imaging.

The imaging screen shown in FIG. 6A basically includes the same display regions as those in the new examination input screen described with reference to FIGS. 5A to 5C. As shown in FIG. 6A, newly added display regions are the image display region 110, a message region 111, an image processing setting region 112, and an examination termination button 113.

When the imaging screen is displayed, the display control unit 16 performs display control to display, in a selected state by default, the imaging method button 109 (for example, the front-of-chest button 109a) which is arranged in the uppermost portion in the imaging information display region 105. Along with this, the control unit 5 of the radiation imaging apparatus 1 transmits, to the radiation generation control unit 4, the imaging condition (tube voltage, tube current, irradiation time, and the like) set in correspondence with the selected imaging method button (imaging method). The control unit 5 then controls the radiation detector 7 in accordance with the set imaging condition to be ready for imaging.

If it is ready for imaging, the control unit 5 of the radiation imaging apparatus 1 changes the state of the radiation detector 7 to an imaging enable state. At this time, the display control unit 16 performs display control to display a "Ready message" indicating the imaging enable state in the message region 111.

Next, the operator confirms the imaging method, and performs imaging settings and positioning of the object. When the series of imaging preparation operations is complete, the operator presses a radiation irradiation switch (not shown) after confirming the imaging enable state by referring to the message region 111. After that, the control unit 5 of the radiation imaging apparatus 1 causes the radiation generation unit 8 to emit radiation toward the object 18 (a specific portion of the patient), and causes the radiation detector 7 to detect the radiation transmitted through the object 18. This captures a radiation image.

When imaging is complete, the control unit 5 of the radiation imaging apparatus 1 obtains the captured image from the radiation detector 7, and performs image processing for the obtained captured image based on a predetermined image processing condition. The predetermined image processing condition is defined in advance in correspondence with the selected imaging method button (imaging method).

The display control unit 16 of the radiation imaging apparatus 1 performs display control to display the captured image having undergone the image processing in the image display region 110. If the operator confirms the captured image displayed in the image display region 110, and changes the contrast and the like of the captured image, he/she operates buttons such as a contrast button and a luminance button provided in the image processing setting region 112.

Similarly, if the operator changes a cutout region of an output image, he/she operates a cutout button 122, a cutout frame 126, and the like to designate a desired cutout region. When a character string as diagnosis information is added, the operator operates an annotation button 123 and the like to superimpose a graphic object and the character string on the image. If the orientation of the image is not suitable for diagnosis, the operator performs geometric conversion using a rotate button 120, a reverse button 121, and the like. If the operator performs re-imaging, he/she performs radiation imaging again using a re-imaging button 124. As described above, the operator can perform additional image editing processing for the captured image displayed in the image display region 110 by operating various kinds of buttons.

If the image processing in the external processing apparatus 17 is used, the operator presses an external processing button 130 via the operation unit 3. For the imaging method, whether to enable the external processing, the request destination of the external processing in a case where the external processing is enabled, and the contents of the external processing are preset (for example, the imaging method table 3A and the external processing table 3B shown in FIG. 3). Alternatively, the control unit 5 can set whether transmission of a medical image (radiation image) to the external processing apparatus 17 is enabled.

If there are a plurality of external processing apparatuses 17, whether transmission of a radiation image is enabled may be set for each of the plurality of external processing apparatuses 17 or whether transmission is enabled may collectively be set. For example, if the image of the front-of-chest button 109a is displayed in the image display region 110, the external processing button 130 is enabled in accordance with the setting (for example, ON of external processing of imaging method ID 1 in the imaging method table 3A of FIG. 3) of enabling the external processing of the imaging method corresponding to the front-of-chest button 109a. That is, display control is performed so as to be able to press the external processing button 130 in a case where the external processing is enabled, and not to be able to press the external processing button 130 in a case where the external processing is OFF.

When the operator presses the external processing button 130 via the operation unit 3, the input/output unit 27 transmits the radiation image displayed in the image display region 110 to the external processing apparatus 17. That is, when the external processing button 130 for transmitting a medical image (radiation image) is enabled based on the setting (ON of external processing) in the imaging method table 3A, it is possible to transmit, to the external processing apparatus 17, the medical image (radiation image) to be processed.

If there are the plurality of external processing apparatuses 17, the input/output unit 27 transmits the medical image (radiation image) to the external processing apparatus 17 preset to make a processing request, among the plurality of external processing apparatuses 17. In the screen display shown in FIG. 6A, with respect to the processing request destination set for the imaging method corresponding to the front-of-chest button 109a, for example, system A is set as a transmission destination as set in the imaging method table 3A.

When transmitting the captured image (radiation image) from the radiation imaging apparatus 1 to the external processing apparatus 17, additional information is added to the captured image (radiation image) to be transmitted. The additional information is added with identification information (image ID) for identifying the captured image (radiation image) and additional information indicating processing contents to be performed by the external processing apparatus 17. That is, the input/output unit 27 of the radiation imaging apparatus 1 adds the additional information to the captured image (radiation image) and transmits the image to the external processing apparatus 17 (processing request destination). The external processing apparatus 17 (processing request destination) performs, for the radiation image, processing based on the processing contents set in the additional information. Note that in an operation always using image processing in the external processing apparatus 17, it may be configured to transmit the radiation image from the radiation imaging apparatus 1 to the predetermined external processing apparatus 17 (processing request destination) upon obtaining the radiation image along with imaging without pressing the external processing button 130. That is, the source image may be transmitted to the predetermined external processing apparatus 17 (processing request destination) at the timing of generating (obtaining) the source image to be processed by the external processing apparatus 17, or the source image to be processed may be transmitted to the predetermined external processing apparatus 17 (processing request destination) when the operator presses the external processing button 130 via the operation unit 3.

The examination order received from the RIS 12 includes imaging information. By enabling external processing in the imaging information, the HIS 11 or the RIS 12 can request to generate an image having undergone predetermined external processing by the external processing apparatus 17.

Upon obtaining the processing information having undergone the predetermined external processing from the external processing apparatus 17, the control unit 5 associates the captured image with the processing information using a captured image ID (to be also referred to as an image ID hereinafter) added to the processing information. That is, the examination management unit 24 searches for the source image of the processing in the storage unit 23 using the additional information of the processing information as association information for associating the source image with the processing information, and associates the found source image with the processing information. Information concerning the processing information such as a captured image ID may be obtained by communication different from reception of the processing information. That is, the examination management unit 24 may search for the source image of the processing in the storage unit 23 using the association information obtained from the external processing apparatus 17 by communication different from the processing information, and associate the found source image with the processing information. The processing information associated with the source image is displayed as a thumbnail image within the same front-of-chest button 109a (first region) as the captured image.

The operator repeats the above-described procedure to performs imaging by all the imaging methods (imaging conditions) in the imaging information display region 105. When all the imaging operations end, the operator presses the examination termination button 113. This terminates the series of examinations. In the radiation imaging apparatus 1, the control unit 5 adds the examination information, the imaging condition, and the like as additional information, and then outputs the image object to, for example, the PACS 13, the printer 14, the storage unit 23 in the self apparatus, or the like.

With respect to the processed image, for example, whether to output the processed image to the image management server (PACS 13) can be preset for each imaging method in the imaging method table shown in FIG. 3. The control unit 5 (input/output unit 27) outputs, to the image management server, only the processed image of the imaging method for which the output processing to the image management server is enabled. That is, the control unit 5

(input/output unit 27) controls output of the processed image to the image management server based on the setting of whether to enable output of the processed image to the image management server. Furthermore, the control unit 5 (input/output unit 27) transmits, to the HIS 11, examination execution information to make a notification of examination termination in the radiation imaging apparatus 1. The pieces of identification information of the processed image received before examination termination are included as objects during the examination in the examination execution information. Then, the display control unit 16 of the radiation imaging apparatus 1 displays the new examination input screen on the display unit 2 again (FIG. 5A).

Reception Procedure of Processing Information

FIG. 7 is a flowchart illustrating an example of a reception processing procedure of obtaining processing information as an image processing method by the radiation imaging apparatus 1 according to the embodiment. The reception status determination unit 32 of the processing information determination unit 31 updates and determines a reception status, and the display control unit 16 displays, on the display unit 2, a notification according to the determination result of the reception status determination unit 32. A processing procedure will be described with reference to the imaging screen shown in FIG. 6A.

If the operator presses the external processing button 130 via the operation unit 3, the input/output unit 27 transmits the image object displayed in the image display region 110 to the external processing apparatus 17. Subsequently, the processing by the external processing apparatus 17 is complete, and the input/output unit 27 receives processing information from the external processing apparatus 17 in step S101.

The received processing information is added with the image ID of a processing source, and the reception status determination unit 32 searches, in step S102, for image information of a captured image in the image table using the image ID as a key.

If no image information is extracted (NO in step S103), the reception status determination unit 32 ends the processing of the flowchart shown in FIG. 7. On the other hand, if the image information is extracted (YES in step S103), the reception status determination unit 32 advances the process to step S104.

In step S104, the reception status determination unit 32 updates the processing information reception count from the external processing apparatus 17, which is stored in the image table shown in FIG. 4.

In step S105, the reception status determination unit 32 determines whether all protocols to be executed in an examination to which the captured image specified in step S102 belongs have been executed. If not all the protocols have been executed (NO in step S105), the reception status determination unit 32 ends the processing of the flowchart shown in FIG. 7. On the other hand, if all the protocols to be executed have been executed (YES in step S105), the reception status determination unit 32 advances the process to step S106.

In step S106, with respect to all captured images in the examination to which the captured image specified in step S102 belongs, the reception status determination unit 32 determines whether the processing information request count and the processing information reception count for the external processing apparatus 17, which are stored in the image table, match each other. If the processing information request count does not match the reception count (NO in step S106), the reception status determination unit 32 ends the processing of the flowchart shown in FIG. 7. On the other hand, if the processing information request count matches the reception count (YES in step S106), the reception status determination unit 32 advances the process to step S107.

After the reception status determination unit 32 determines that all the pieces of processing information requested to the external processing apparatus 17 have been received, the display control unit 16 displays, in step S107, based on the determination result of the reception status determination unit 32, on the imaging screen on the display unit 2, a notification (notification button 151) indicating that all the pieces of processing information requested to the external processing apparatus 17 have been received. The notification display (notification button 151) indicates the determination result of the reception status. The display control unit 16 displays, on the display unit 2, at least one of the reception status of the processing information and the determination result of the reception status. That is, the display control unit 16 may display, on the display unit 2, the reception status of the processing information (reception status display region 150) or the reception status and the determination result of the reception status (notification button 151). The display control unit 16 may display the determination result of the reception status of the processing information on the display unit 2.

The notification display on the imaging screen is not limited to the notification button 151 shown in FIG. 6A, and may be various kinds of icons. The notification display (notification button 151) is in a grayed-out state before all the pieces of processing information are received, and is set in a lighting state when all the pieces of processing information are received. By lighting the notification display (notification button 151), it is possible to notify (inform) the operator that all the pieces of processing information having undergone predetermined processes by the external processing apparatus 17 have been received.

A notification may be made using a sound such as a notification sound generally used for notification, or the notification display on the imaging screen on the display unit 2 and a notification using a sound may be combined. For example, in a case where a notification is made using a sound, the control unit 5 can control to output sound source information of a notification sound stored in the storage unit 23 from a sound output unit (not shown) such as a loudspeaker.

Furthermore, a notification may be made to a portable information processing terminal such as a tablet. The notification display on the imaging screen on the display unit 2 and a notification to a portable information processing terminal may be combined. For example, in a case where a notification is made to a portable information processing terminal, the input/output unit 27 of the control unit 5 can transmit the determination result of the reception status determination unit 32 to the predetermined portable information processing terminal.

Note that either the processing in step S105 or the processing in step S106 may be performed first. In step S107, the reception status determination unit 32 can determine whether the examination to which the captured image specified in step S102 belongs is an examination in progress, and control, based on a determination result, whether to make a notification. For example, the reception status determination unit 32 may make no notification in a case where the examination to which the specified captured image belongs is not an examination in progress, and may make a notification in a case where the examination to which the specified captured image belongs is an examination in progress. The display control unit 16 can also control notification display based on the determination result of the reception status determination unit 32.

Display of Reception Status

FIG. 8 is a flowchart illustrating an example of a display processing procedure of displaying the reception status of the processing information from the external processing apparatus 17 by the radiation imaging apparatus 1 according to the embodiment. The reception status determination unit 32 of the processing information determination unit 31 determines the reception status of the associated processing information in accordance with the captured image or the processing information displayed on the display unit 2, and the display control unit 16 displays the determination result of the reception status determination unit 32 on the display unit 2. The processing procedure will be described with reference to the imaging screen shown in FIG. 6A.

First, when the operator presses (selects) one of thumbnail images 114 (114a to 114d), the display control unit 16 displays a captured image or processing information linked with the pressed (selected) thumbnail image in the image display region 110 (second region) of the display unit 2. The display control unit 16 displays the captured image or processing information linked with the pressed (selected) thumbnail image in the image display region 110 (second region) different from the first region (the region in the front-of-chest button 109a or the region in the side-of-chest button 109b).

In step S201, based on the identification information (for example, the image ID) in the image table (FIG. 4) stored in the storage unit 23, the reception status determination unit 32 determines whether the image linked with the pressed (selected) thumbnail image is a captured image or processing information. If the image linked with the pressed (selected) thumbnail image is a captured image (NO in step S201), the reception status determination unit 32 advances the process to step S206. If the image linked with the pressed (selected) thumbnail image is processing information (YES in step S201), the reception status determination unit 32 advances the process to step S202.

If the pressed (selected) thumbnail image is processing information, the confirmation state determination unit 33 determines, in step S202, the confirmation state of the processing information by the operator based on the setting information of the confirmation state in the image table (FIG. 4). That is, based on the setting information of the confirmation state, the confirmation state determination unit 33 determines whether the processing information has already been displayed in the image display region 110 of the display unit 2. If the processing information has been displayed in the image display region 110 of the display unit 2, the confirmation state determination unit 33 determines that confirmation by the operator is complete. If the processing information is not in the unconfirmed state, that is, the operator has confirmed the processing information (NO in step S202), the reception status determination unit 32 advances the process to step S205. On the other hand, if the processing information is in the unconfirmed state (YES in step S202), the confirmation state determination unit 33 advances the process to step S203.

In step S203, the confirmation state determination unit 33 updates the confirmation state of the processing information from the unconfirmed state to a confirmed state.

In step S204, the examination termination possibility determination unit 35 performs examination termination possibility determination in accordance with the confirmation state of the processing information in the same examination. Details of the processing procedure in step S204 will be described later. Note that steps S203 and S204 are described as different steps in FIG. 8, but a processing step obtained by including step S203 in step S204 may be possible.

In step S205, based on the identification information (imaging method ID) of the imaging method, the reception status determination unit 32 specifies the captured image used as the source of the processing information linked with the pressed (selected) thumbnail image.

In step S206, the display control unit 16 displays, as the reception status, the processing information request count and the processing information reception count for the captured image specified by the reception status determination unit 32 in step S205 in the reception status display region 150 of the display unit 2. The display of the reception status display region 150 in FIG. 6A exemplifies the display of the reception status of the processing information request count and the processing information reception count. If the reception status of the request count and the reception count are displayed in a fraction form (reception count/request count), "2" of the denominator represents the processing information request count and "1" of the numerator represents the reception count. Note that the display of the processing information request count and the processing information reception count can be implemented in various forms, and is not limited to the display example shown in FIG. 6A.

If the request count matches the reception count, all the pieces of processing information requested to the external processing apparatus 17 have been received. If the request count matches the reception count, for example, "2/2" is displayed in the reception status display region 150, as shown in FIG. 6B. Then, in FIG. 6A, the notification display (notification button 151) in the grayed-out state is set in the lighting state when all the pieces of processing information are received.

Examination Termination Possibility Determination: S204

Figure 9:
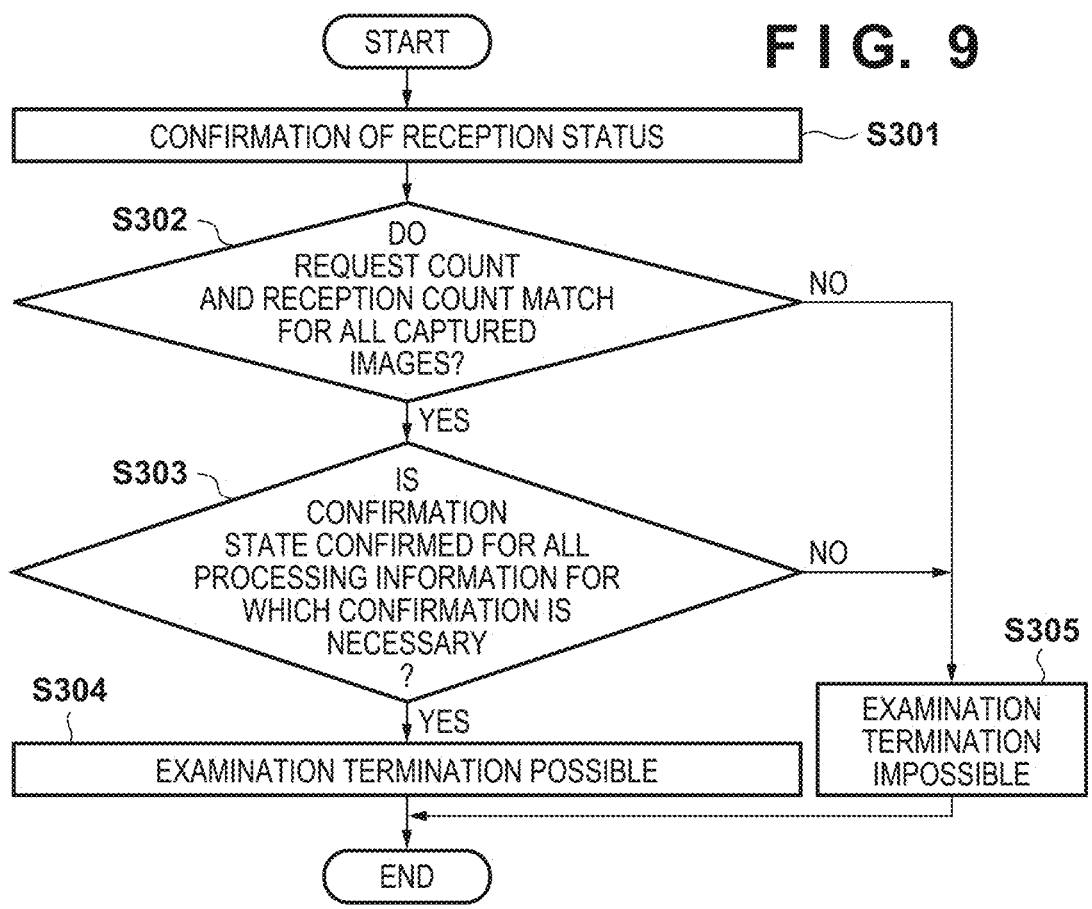
FIG. 9 is a flowchart illustrating an example of an examination termination possibility determination processing procedure.

FIG. 9 is a flowchart illustrating an example of the examination termination possibility determination processing procedure in step S204 of FIG. 8. The examination termination possibility determination unit 35 of the processing information determination unit 31 performs examination termination possibility determination based on the determination result of the reception status by the reception status determination unit 32 and the determination result of the confirmation state by the confirmation state determination unit 33 of the processing information determination unit 31.

In step S301, based on the determination result of the reception status by the reception status determination unit 32, the examination termination possibility determination unit 35 obtains the processing information request count and the processing information reception count with respect to all the captured images in the same examination. In step S302, the examination termination possibility determination unit 35 determines the obtained request count and reception count. If the processing information request count does not match the reception count with respect to all the captured images (NO in step S302), the examination termination possibility determination unit 35 advances the process to step S305. In step S305, the examination termination possibility determination unit 35 disables examination termination.

On the other hand, if it is determined in the determination processing in step S302 that the processing information request count matches the reception count with respect to all the captured images in the same examination (YES in step S302), the examination termination possibility determination unit 35 advances the process to step S303.

In step S303, all the pieces of processing information requested to the external processing apparatus 17 have been received. Based on the determination result of the confirmation state by the confirmation state determination unit 33, the examination termination possibility determination unit 35 determines the confirmation state of the processing information for which the confirmation necessity information is "necessary", that is, the processing information preset as information which needs to be confirmed by the operator, among all the pieces of processing information. If, among the pieces of processing information preset as information which needs to be confirmed by the operator, there is processing information whose confirmation state is not "confirmed" (processing information for which the setting information of the confirmation state is "unconfirmed") (NO in step S303), the examination termination possibility determination unit 35 advances the process to step S305, and disables examination termination.

On the other hand, if it is determined in the determination processing in step S303 that all the confirmation states of the pieces of processing information preset as information which needs to be confirmed by the operator are "confirmed" (YES in step S303), the examination termination possibility determination unit 35 advances the process to step S304. In step S304, the examination termination possibility determination unit 35 enables examination termination.

Time-Out Processing

Figure 10:
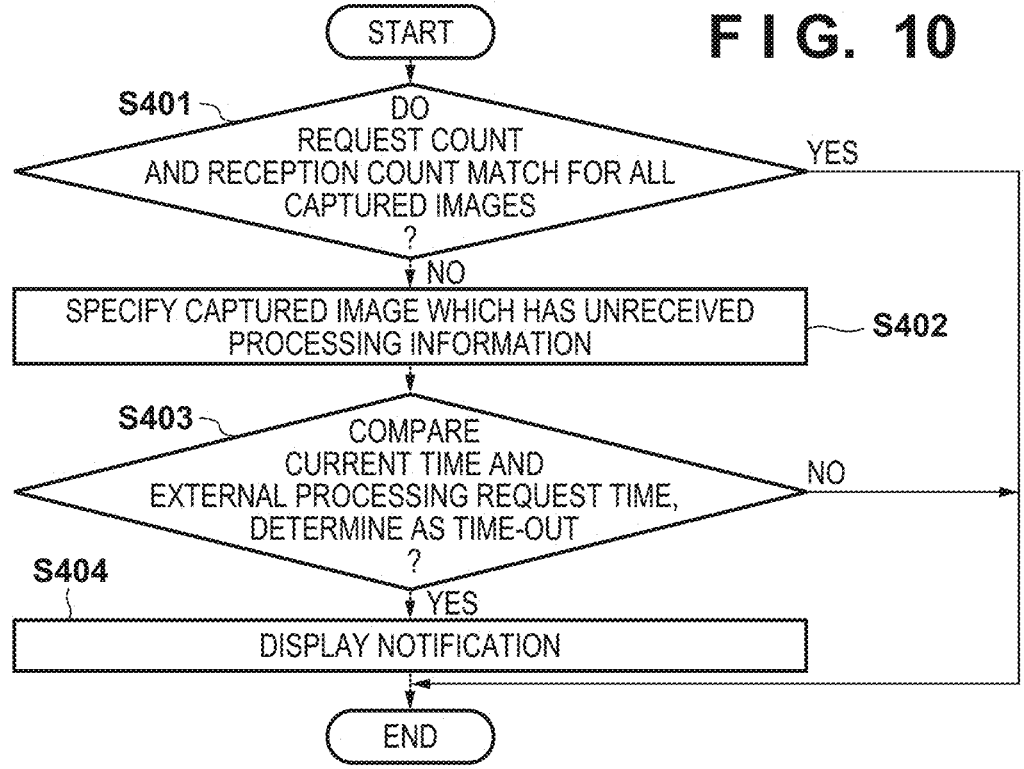
FIG. 10 is a flowchart illustrating an example of a time-out processing procedure.

FIG. 10 is a flowchart illustrating an example of a time-out processing procedure, by the radiation imaging apparatus 1 according to the embodiment, of determining whether an elapsed time from a request time at which processing of the radiation image is requested to the external processing apparatus 17 to the current time exceeds a predesignated time-out time. The time-out determination unit 34 of the processing information determination unit 31 determines whether a time taken to output processing information from the external processing apparatus 17 exceeds the time-out time. This processing may be executed every time a predetermined time elapses or may be executed by using, as a trigger, reception of processing information or an arbitrary operation by the operator. Note that the time-out time can arbitrarily be set, and a different time-out time may be set in accordance with the request destination (system A, system B, . . . ) of the processing among the plurality of external processing apparatuses 17. Furthermore, a different time-out time may be set in accordance with the processing contents (processing 1, processing 2, . . . ) performed by the external processing apparatus 17.

First, in step S401, the time-out determination unit 34 determines whether the processing information request count matches the reception count with respect to all the captured images in the same examination. This processing is the same processing as that in step S302 of the flowchart of FIG. 9. If the processing information request count matches the reception count with respect to all the captured images (YES in step S401), the time-out determination unit 34 ends the processing shown in the flowchart of FIG. 10. On the other hand, if it is determined in the determination processing in step S401 that the processing information request count does not match the reception count with respect to all the captured images (NO in step S401), the time-out determination unit 34 advances the process to step S402.

In step S402, if there exists processing information that has not been received from the external processing apparatus 17, the time-out determination unit 34 specifies a captured image as the source of the unreceived processing information. The time-out determination unit 34 specifies a captured image as the source of the unreceived processing information based on the information (for example, the request count, the reception count, the image ID, and the like) stored in the image table (FIG. 4). In the example of the image table shown in FIG. 4, as the reception status of the processing information whose source image has image ID 5, the request count is "3", the reception count is "2", and one piece of unreceived processing information remains. The time-out determination unit 34 specifies the image of image ID 5 as a captured image as the source of the processing information.

In step S403, the time-out determination unit 34 compares the current time with the external processing request time of the captured image specified in step S402, and determines whether the elapsed time from the external processing request time to the current time exceeds the predesignated time-out time. If the elapsed time does not exceed the predesignated time-out time (NO in step S403), the time-out determination unit 34 ends the processing of the flowchart shown in FIG. 10. On the other hand, if it is determined in the determination processing in step S403 that the elapsed time exceeds the predesignated time-out time (YES in step S403), the time-out determination unit 34 advances the process to step S404.

In step S404, if the time-out determination unit 34 determines that there is the external processing apparatus 17 for which the elapsed time has exceeded the predesignated time-out time and a time-out has occurred, the display control unit 16 displays, based on the determination result of the time-out determination unit 34, a notification indicating the occurrence of the time-out on the imaging screen on the display unit 2. For example, the notification indicating the occurrence of the time-out may be displayed on the imaging screen like the notification button 151. A notification (for example, a notification button 152 shown in FIG. 6C) different from the notification button 151 may be displayed on the imaging screen. The notification display indicating the occurrence of the time-out is not limited to the notification button 152 shown in FIG. 6C, and various kinds of icons may be used. Furthermore, a notification may be made using a sound such as a notification sound generally used for notification, or the notification display on the imaging screen on the display unit 2 and a notification using a sound may be combined. For example, in a case where a notification is made using a sound, the control unit 5 can control to output sound source information of a notification sound stored in the storage unit 23 from a sound output unit (not shown) such as a loudspeaker.

To discriminate the above notification display from the notification display indicating reception completion in step S107, the design of a button or icon, a display color, a sound type, and the like may be different from those used for the notification indicating reception completion in step S107.

In step S404, instead of making a notification of the occurrence of the time-out, at least one of the external processing apparatus 17 for which the time-out has occurred, the processing contents requested to the external processing apparatus 17, the protocol information of the captured image (radiation image), the examination information to which the captured image (radiation image) belongs (examination information associated with the captured image (radiation image)), and the like may be stored as log information in the storage unit 23.

After the processing in step S404, the time-out determination unit 34 inquires of the external processing apparatus 17 for which the time-out has occurred. If no response is returned, the time-out determination unit 34 determines that a failure may have occurred in the external processing apparatus 17 for which the time-out has occurred, and the display control unit 16 may make a notification on the imaging screen based on the determination result of the time-out determination unit 34, like the notification button 151. As in the display example of the imaging screen shown in FIG. 6C, the processing contents requested to the external processing apparatus 17 for which the time-out has occurred may be displayed on the imaging screen on the display unit 2 (a time-out content display 153 shown in FIG. 6C). Furthermore, if the time-out determination unit 34 inquires of the external processing apparatus 17 for which the time-out has occurred, and receives a response from the external processing apparatus 17, the time-out determination unit 34 may control the transmission unit 27a of the input/output unit 27 to retransmit, to the external processing apparatus 17 for which the time-out has occurred, the information stored as the log information in the storage unit 23 or the radiation image for which the time-out has occurred, thereby retrying the time-out external processing.

If the radiation image for which the time-out has occurred is retransmitted, the time-out determination unit 34 specifies, based on the log information in the storage unit 23, the radiation image as the processing target of the external processing that has been interrupted due to the time-out. The examination information included in the log information is associated with the captured image (radiation image), and the time-out determination unit 34 specifies, as the radiation image as the processing target of the external processing, the captured image (radiation image) associated with the examination information included in the log information. Then, the time-out determination unit 34 may control the transmission unit 27a of the input/output unit 27 to retransmit the specified radiation image to the external processing apparatus 17 for which the time-out has occurred, thereby retrying the time-out external processing. If the radiation image is retransmitted, the display control unit 16 performs display control not to update the request count.

If the information stored as the log information in the storage unit 23 is transmitted (retransmitted) to the external processing apparatus 17 for which the time-out has occurred, the external processing apparatus 17 for which the time-out has occurred specifies the radiation image as the processing target of the external processing based on the log information. The examination information included in the log information is associated with the captured image (radiation image), and the external processing apparatus 17 specifies, as the radiation image as the processing target of the external processing, the captured image (radiation image) associated with the examination information included in the log information. Then, the external processing apparatus 17 for which the time-out has occurred generates processing information by performing external processing (retry) for the specified radiation image. If the log information is transmitted to the external processing apparatus 17, the display control unit 16 also performs display control not to update the request count.

According to the disclosed technique, it is possible to display the reception status of processing information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008951, filed Jan. 24, 2023 which is hereby incorporated by reference herein in its entirety.

What is claimed is:

1. An image processing apparatus for processing a radiation image, comprising:
   a reception unit configured to receive processing information obtained by processing of the radiation image by an external processing apparatus; and
   a display control unit configured to control displaying at least one of a reception status of the processing information and a determination result of the reception status on a display unit.

2. The apparatus according to claim 1, wherein the display control unit controls displaying the reception status and the determination result of the reception status on the display unit.

3. The apparatus according to claim 1, wherein the processing information includes at least one of an image obtained by performing image processing for the radiation image, an image obtained by performing overlay processing for the radiation image, an image obtained by performing annotation processing for the radiation image, and diagnosis information obtained by the image processing for the radiation image.

4. The apparatus according to claim 1, further comprising a determination unit configured to perform determination processing using the processing information,
wherein the determination unit determines whether a request count of the processing of the radiation image matches a reception count of the processing information in the same examination, and
the display control unit controls displaying, on the display unit, as the determination result, a notification display indicating that the request count matches the reception count.

5. The apparatus according to claim 4, wherein the display control unit controls displaying, on the display unit, the request count of the processing of the radiation image and the reception count of the processing information as the reception status.

6. The apparatus according to claim 5, wherein the display control unit updates the reception count of the processing information by newly receiving the processing information from the external processing apparatus.

7. The apparatus according to claim 4, wherein the display control unit controls displaying a thumbnail image of the radiation image and a thumbnail image of the processing information in a first region of the display unit.

8. The apparatus according to claim 7, wherein in a case where the thumbnail image of the processing information in the first region is displayed in a second region, different from the first region, of the display unit, the determination unit updates a confirmation state, stored in a storage unit, of the processing information requested to be confirmed by an operator from an unconfirmed state a confirmed state.

9. The apparatus according to claim 4, wherein
the determination unit determines whether an elapsed time from a request time, at which the processing of the radiation image is requested to the external processing apparatus, to a current time exceeds a predesignated time-out time, and
in a case where the elapsed time exceeds the time-out time, the display control unit controls displaying, on the display unit, a notification indicating occurrence of a time-out.

10. The apparatus according to claim 9, wherein as the time-out time, a different time is set in accordance with a request destination of the processing among a plurality of external processing apparatuses.

11. The apparatus according to claim 9, wherein as the time-out time, a different time is set in accordance with contents of the processing to be performed by the external processing apparatus.

12. The apparatus according to claim 9, wherein in a case where the elapsed time exceeds the time-out time, the determination unit stores, in a storage unit, as log information, at least one of an external processing apparatus for which the time-out has occurred, contents of the processing requested to the external processing apparatus, protocol information of the radiation image, and examination information to which the radiation image belongs.

13. The apparatus according to claim 12, wherein the determination unit inquires of the external processing apparatus for which the time-out has occurred, and controls, in a case where a response is received from the external processing apparatus, a transmission unit to retransmit, to the external processing apparatus for which the time-out has occurred, one of the information stored as the log information and the radiation image for which the time-out has occurred.

14. The apparatus according to claim 12, wherein the determination unit inquires of the external processing apparatus for which the time-out has occurred, and determines, in a case where no response is returned from the external processing apparatus, that a failure has occurred in the external processing apparatus, and
the display control unit controls displaying, on the display unit, the external processing apparatus for which the time-out has occurred and the contents of the processing requested to the external processing apparatus.

15. The apparatus according to claim 8, further comprising a termination possibility determination unit configured to determine, based on the determination result of the determination unit, whether an examination in progress can be terminated,
wherein the termination possibility determination unit sets to be able to terminate the examination in a case where the request count matches the reception count, and all the confirmation states of the pieces of processing information requested to be confirmed by the operator are the confirmed states.

16. The apparatus according to claim 15, wherein the termination possibility determination unit sets not to be able to terminate the examination in a case where the request count does not match the reception count or processing information in the unconfirmed state is included among the confirmation states of the pieces of processing information requested to be confirmed by the operator.

17. A radiation imaging system comprising:
a radiation detector; and
an image processing apparatus according to claim 1, configured to process a radiation image obtained by imaging using the radiation detector.

18. An image processing method of processing a radiation image, comprising:
receiving processing information obtained by processing of the radiation image by an external processing apparatus;
controlling to display at least one a reception status of the processing information and a determination result of the reception status on a display unit.

19. A non-transitory computer-readable storage medium storing a program for causing a computer to execute the method according to claim 18.

* * * * *